United States Patent
Eichert et al.

(10) Patent No.: US 6,393,474 B1
(45) Date of Patent: May 21, 2002

(54) DYNAMIC POLICY MANAGEMENT APPARATUS AND METHOD USING ACTIVE NETWORK DEVICES

(75) Inventors: Stuart Eichert, Middlebury, CT (US); Danny M. Nessett; Wenjun Luo, both of Fremont, CA (US); Elaine Lusher, Pleasanton, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/223,829

(22) Filed: Dec. 31, 1998

(51) Int. Cl.[7] ............................................... G06F 15/16
(52) U.S. Cl. ....................................... 709/223; 709/221
(58) Field of Search .......................... 709/201, 223, 709/224, 226, 244, 245, 300, 303, 208, 209, 221; 370/231, 242, 464, 465

(56) References Cited

U.S. PATENT DOCUMENTS

| | | | | |
|---|---|---|---|---|
| 4,881,263 | A | | 11/1989 | Herbison et al. ............. 380/21 |
| 5,426,421 | A | * | 6/1995 | Gray .......................... 709/223 |
| 5,577,209 | A | | 11/1996 | Boyle et al. ............ 395/200.06 |
| 5,606,668 | A | | 2/1997 | Shwed .................. 395/200.11 |
| 5,608,720 | A | * | 3/1997 | Biegel et al. ................ 370/465 |
| 5,740,375 | A | | 4/1998 | Dunne et al. .......... 395/200.68 |
| 5,870,561 | A | * | 2/1999 | Jarvis et al. ................ 709/223 |
| 5,872,928 | A | * | 2/1999 | Lewis et al. ................ 709/222 |
| 5,889,953 | A | * | 3/1999 | Thebaut et al. ............. 709/224 |
| 5,893,083 | A | * | 4/1999 | Eshghi et al. ............... 709/224 |
| 5,905,900 | A | * | 5/1999 | Combs et al. .............. 713/220 |
| 6,000,045 | A | * | 12/1999 | Lewis ......................... 709/223 |

OTHER PUBLICATIONS

Mazumdar, S. et al.; "Design of Protocol Independent Management Agent to Support SNMP and CMIP Queries"; Integrated Network Management III; Elsevier Science Publishers B.V. (North–Holland); Magazine, pp. 377–388, Dec. 1993.*

Agha, G.A. et al.; "Modular heterogeneous system development: a critical anaysis of Java", Proceedings of the Seventh Heterogeneous Computing Workshop; ISBN: 0–8186–8365—1; pp. 144–145, Mar. 1998.*

Alexander, D.S. et al. "Active Bridging", CIS Department, University of Pennsylvania, SIGCOMM, 1997, Cannes France; ACM 0–89791–905—x/97/0009.

Tennenhouse, D.L. et al. "Towards an Active Network Architecture", Computer Communication (1996), pp. 5–18.

Tennenhouse, D.L. et al. "A survey of Active Network Research" IEEE Conference, Jan. 1997.

(List continued on next page.)

Primary Examiner—Mark H. Rinehart
Assistant Examiner—Marc D. Thompson
(74) Attorney, Agent, or Firm—Mark A. Haynes; Haynes Beffel & Wolfeld LLP (57) ABSTRACT

A system for providing policy management in a network that includes nodes operating in multiple protocol layers and having enforcement functions. Multiple network devices, such as routers, remote access equipment, switches, repeaters and network cards, and end system processes having security functions are configured to contribute to implementation of policy enforcement in the network. By distributing policy enforcement functionality to a variety of network devices and end systems, a pervasive policy management system is implemented. The policy management system includes a policy implementation component that accepts policy, i.e. instructions or rules, that define how the network device should behave when confronted with a particular situation. The management system further includes a management station interface operating pursuant to a first process capable of providing an object to the network, the object including variables and one of a method or instructions to locate a method, executable on the network to set up a second process to enforce a portion of the policy.

7 Claims, 5 Drawing Sheets

OTHER PUBLICATIONS

Redscape, "Intelligent Management With Redscape Policy Framework" (1998).

Redscape, "Solving IT Administration Problems With Open Policy Management" (1998).

Blaze, et al., "Decentralized Trust Management", IEEE Conference on Security and Privacy, May 1996.

Simon, et al., "Adage: An Architecture for Distributed Authorization", OSF Research Instittute, pp. 1–108, Dec. 2, 1996.

Weissman, C., "Blacker: Security for the DDN Examples of A 1 Security Engineering Trades", IEEE Symposium on Research and Privacy, pp. 286–292 (1992).

Cobra Security, "The Administrator's Interfaces", Cobra Security, pp. 135–159.

Check Point Software Technologies, Ltd., "Security Platform Strategy", www.checkpoint.com (1997).

Instruction Manual, "Firewall–1; Managing Firewall–1 Using the OpenLook GUI", User Guide Version 2.1, pp. 1.1–1.19.

Guttman, J., "Filtering Postures: Local Enforcement for Global Policies", Paper No. 1081–6011/97, IEEE, from the Proc. of the 1997 IEEE Symposium on Security and Privacy, May 4–7, 1997, pp. 120–129.

"User's Guide: PC Firewall for Windows 3.1x Windows 95, and Windows NT", McAfee, Inc., Santa Clara, CA, Oct. 1996, pp. 1–24.

Check Point Software Technologies, Ltd., "Write Once, Manage Everything'Functionality to Enterprise Security Management", http://www.checkpoint.com, Oct 1997.

Check Point Software Tech., Ltd., "Open Security Manager Data Sheet", http://www.checkpoint.com, (1998).

Semeria, C., "Internet Firewalls and Security—A Technology Overview", 3Com Corporation, Santa Clara, CA, pp. 1–16 (1996).

Holbrook, P. et al., "Site Security Handbook" Request for Comments, RFC 1244, Jul. 1991, 90 pages, (http://www.cis.ohio–state.edu/htbin/rfc/rfc 1244.html).

* cited by examiner

ARCHIVE / FILE

FIG. 4

SYSTEM HIERARCHY

DYNAMIC POLICY MANAGEMENT APPARATUS AND METHOD USING ACTIVE NETWORK DEVICES

RELATED APPLICATION DATA

The present patent application is related to our co-pending application entitled Multilayer Firewall System, U.S. application Ser. No. 08/865,482, filed May 29, 1997, which is incorporated by reference as if fully set forth herein.

BACKGROUND OF THE INVENTION

1. Field of the Invention

The present invention relates to establishing and enforcing system policy on a network; and more specifically to systems employing dynamic policy management using active networking devices to establish and enforce system policy.

2. Discussion of the Related Art

The Internet has grown significantly over the past several decades, yet there are signs that applications would benefit from a richer set of Internet services. For example, the expected growth in voice over IP (VoIP) traffic on the Internet will change its overall traffic characteristics. While up to now real-time delivery requirements for IP traffic have been rare, VoIP packets must be delivered within fairly strict time constraints. Since the volume of VoIP traffic is likely to grow into a high percentage of Internet traffic, the services required by the Internet will change. As other real-time traffic, such as that supporting video, becomes prominent, the effect on Internet services will be even more dramatic.

The growth of the Internet and the use of IP based technology has also created a corresponding growth in the number of systems administrators must manage. This scaling problem is being addressed by the use of policy based management systems, whereby administrators specify what should happen and leave it to the policy management system to determine procedures to implement the policy.

The system administrators' task of administering policy is even further complicated by legacy systems. As networks evolve, older equipment, i.e., legacy systems, remain that may not be able to participate in a particular management policy. Alternately, legacy systems may be able to participate, but the methods required to execute the policy are different, thereby complicating the implementation of the policy. Because of the variety of devices and legacy systems, the complexity of implementing a management policy makes it difficult to establish the policy across all layers and device types of the network, and particularly difficult to maintain such a policy management system even if it could be successfully implemented.

Typically in the prior art a central management station that dispatches instructions to the network devices as needed controls the policy management. The instructions may be very basic, such as telling the device to shut down, or very complex requiring the device. Often the instructions are in response to repetitive processes that are executed periodically, i.e., daily or weekly, or on the occurrence of some event. If system congestion is high or the management system is inoperative, the appropriate action may not be taken, thereby creating system performance degradation; and in the worse case scenario this could lead to system failure.

Accordingly, it is desirable to implement a policy management system which allows for system policy to be executed and maintained at the network device level across layers of network systems and protocols.

SUMMARY OF THE INVENTION

Accordingly, the present invention is directed to a dynamic policy management apparatus and method using active network devices that provide for policy enforcement.

The present invention provides a system for providing policy management in a network that includes passive nodes and active nodes operating in multiple protocol layers and having enforcement functions. A variety of network devices, i.e., nodes or active nodes, such as routers, remote access equipment, switches, repeaters, network cards, and end system processes having security functions, are configured to contribute to the implementation of policy enforcement in the network. By distributing policy enforcement functionality to a variety of network devices and end systems, a pervasive policy management system is implemented. The policy management system includes a policy implementation component that accepts policy, i.e., instructions or rules that define how the network device should behave when confronted with a particular situation. The policy enforcement is performed by network devices having tools and resources to execute the active packets distributed throughout the network to enforce the defined policy. The policy being implemented can be implemented across multiple protocol layers and must be coordinated by the policy management system such that particular devices enforce that part of the policy pertinent to their part of the network.

For example, a router in the network enforces that part of the policy that is pertinent to those systems and network devices whose traffic might traverse the router. A switch enforces that part of the policy that is pertinent to those systems and network devices whose traffic traverses the switch. A repeater enforces that part of the policy that is pertinent to those systems and network devices whose traffic traverses the repeater. A network interface card with processing resources (smart NIC) enforces that part of the policy that is pertinent to the system or device to which it is connected. In addition, other parts of the network are included in the policy management hierarchy, such as end system operating systems and applications, remote access equipment, network management systems for controlling network traffic and monitoring network traffic, and other auxiliary systems such as name services file services are included in the collection of network devices that are called upon to enforce a portion of the policy being implemented by the present invention.

To implement the system policy a network manager uses a management station to specify policy for a network. The management station employs a policy definition system, (PDS) supporting a policy definition language (PDL) to create a programming language active packet, which represents at least one rule of the policy, which is then encapsulated in preparation for transmission to the active network devices. The active packet includes, but is not limited to, an object-oriented programming language, such as C++, CAML, JAVA, and Python, having objects and scripting programming language, such as Practical Extraction and Report Language (PERL), Tool Command Language (TCL), or employing shells, e.g. Unix supports Bourne shell, Korn shell, and C-shell code. The active packet is stored in an active packet file on a memory device and the file is optionally signed with a digital signature. The active packet file is either deposited in a network directory, or other distributed database, or sent through the network to the enforcement device and stored in its memory. The enforcement device is signaled when a new policy, represented by the active packet file, or it is available. The signal may contain the active packet or it may inform the device to find the active packet in a network directory or distributed database.

After the enforcement device obtains the active packet file, it is optionally verified via the signature to determine the privileges the active packet should be granted. The active packet file is then extracted from the memory location and the active packet is prepared for execution. The enforcement device checks to see if it has the implementing code (at least one variable, method, and/or data) for the active packet loaded in its memory. If not, the enforcement device obtains the code from a distributed database or directory, or another enforcement device, or similar memory device.

The policy definition language comprises a mobile programming language which in turn includes, but is not limited to, object-oriented and scripting programming languages. If the mobile programming language is an object-oriented language then the active packet comprises an active object, i.e. code plus data, normally referred to just as an object. For each object a thread of execution is established, and the object is executed. The object they uses the services available to it on the enforcement device to enforce the policy or a of the policy. If the mobile programming language is a scripting programming language the active packets comprises active code, normally referred to just as code. The code alone with an interpreter for interpreting the code is transferred to the enforcement device. The code then uses the services available to it on the enforcement device to enforce the policy or a portion of the policy. Several enforcement devices may be utilized to execute a certain policy. Therefore, a particular enforcement device may only enforce a portion of the policy.

The reader should note that the remainder of the disclosure will primarily focus on active packets comprising objects. Those of ordinary skill in the art will appreciate that substantially the same processes and procedures applicable to active objects are applicable to active code. Throughout the disclosure any reference made to an object, unless otherwise stated, refers to an object-oriented object and any reference made to code, unless otherwise stated, refers to a code associated with a scripting programming language.

The management station software provides the system administrator with resources to input a list of rules describing the policy to be enforced on a network. The management station PDS is a software product that creates one or more programming language active packets as previously explained, which represent the rules. The objects, once created, are in a ready-to-run state and are invoked by a thread of execution to implement the processes that they represent. The invocation of the object establishes a thread that can execute independently of other processes running on the various network devices. A process can have several threads running concurrently, each performing different jobs such as waiting for events to occur or performing some other time consuming task. When a thread has finishes its job, the thread is suspended or destroyed and the resources utilized are returned to the system.

After the creation of one or more objects, the management station software will encode the objects into a transportable format. Upon the completion of the encoding, the data identifying the code that the objects need in order to be executed is associated with the encoded transportable objects. After storing the objects to an object file, the management station software will optionally sign the file. The purpose of signing the file is to allow the enforcement device to decide which rights and privileges to grant the objects when they are executed on the enforcement device.

The optionally signed file can either be deposited in a on a storage device, which includes but is not limited to a directory server or distributed database, or sent to the enforcement device via the network. If the file has been deposited in a directory server or distributed database, the management station will either provide the enforcement device with the address to the storage location or the device will know to retrieve the file at a specified location. The notification that an object file is available for the enforcement device can occur in many ways including, but not limited to, the changing of a state or variable that the enforcement device monitors.

If the enforcement device receives a signal indicating that a new policy, represented by the object file, is available for it on a directory server or distributed database, it will retrieve the object file. Upon retrieval or receipt of the object file, the enforcement device will extract the object file contents.

The enforcement device will optionally verify the signature of the object file, as previously stated, to determine which of its base services that it will allocate to the objects in the signed file to utilize in the implementation of its proscribed functions. The enforcement device will then examine the data within the file which specifies the code required by the objects. If it does not have the code stored in its memory, it will extract the code or a reference to the code from the file. If the code is in the enforcement device's memory it is then loaded into its program memory and executed. Otherwise, the device uses the reference to retrieve the code from a directory server or distributed database.

The present invention provides distinct advantages over the prior art, in that traditionally, policy is represented as flat data, requiring an enforcement device to understand its syntax. If this syntax changes, either to add new kinds of policy terms or to restructure the representation, all enforcement devices must be reprogrammed to parse the new syntax.

With the present invention, the contract between the network device and network management system involves only the methods that a policy object exports. Thus, new methods can be added to an object class that control new aspects of policy without affecting legacy enforcement devices. Also, the internal representation of policy may change without affecting either the network management station or the enforcement device.

The present invention further supports a process called co-location, which enables the objects to be distributed with their code, or references to their code that implements the policy, throughout the network. Co-location enables new policy implementations to be distributed to devices without changing the underlying base implementations of the devices. For instance, legacy systems would have to be re-booted in order for new policy implementations to be enabled. Co-location permits the legacy systems to continue their base functions undisturbed while a new policy is implementation is distributed to the enforcement devices.

Another advantage of the present invention is the separation of policy rule enforcement, which is accomplished by creating an independent thread for each object representing a particular rule. Network administrators can independently stop or start the enforcement of each rule in the policy specification without affecting-the enforcement of other polices in the specification.

Additional features and advantages of the invention will be set forth in the detailed description which follows, and in part will be apparent from the description, or may be learned by practice of the invention. The aspects and other advantages of the invention will be realized and attained by the structure particularly pointed out in the written description and claims hereof as well as the appended drawings.

To achieve these and other advantages and in accordance with the purpose of the present invention, as embodied and broadly described, the present invention can be characterized according to one aspect as a system providing dynamic policy management in a network, including a management station coupled to said network, the management station: including resources to store data defining policy rules for a device in the network. Resources in the management station are included for producing an active packet including at least a variable and a method, in response to the data defining the policy rule, the active packet having a format. Resources in the management station are included for sending the active packet to the network device adapted to read and execute the active packet according to the format.

Another aspect of the present invention can be characterized as a system for dynamic policy management in a network, including a network device coupled to said network, the network device including resources to receive an active packet representing a policy rule from a second device in the network, the active packet having a format; resources in the network device for decoding the active packet according to the format, the active packet including a variable and a method; and resources in the network device for executing the active packet.

A further aspect of the present invention can be characterized as a system for dynamic policy management in a network including a management station and a network device coupled to said network, wherein the management station includes:

1) resources to store data defining a policy rule for a device coupled to the network;
2) resources in the management station for producing an active packet including a variable and a method in response to the data defining the policy rule, the active packet having a format; and
3) resources in the management station for sending the active packet to the network device, wherein the network device includes resources to receive, decode, and execute the active packet according to the format.

A still further aspect of the present invention can be characterized as a system providing dynamic policy management by a method, the system, including an interface adapted to receive instructions characterizing policy regarding control of a network; and an active node connected to the interface which provides a packet to the network, the packet including one of a variable and a method and a reference to the variable and the method, executable on the network to set up a process to enforce at least a portion of the policy.

Another aspect of the present invention can be characterized as a system for dynamic policy management in a network, including a network node adapted to receive a packet, created by a first process, representing policy for control of a network; and resources in the network node capable of executing a packet including one of a variable and a method and instructions to locate the variable and the method, executable on the network node to enforce a portion of the policy.

An additional aspect of the present invention can be characterized as a system for dynamic policy management in a network, including an active node and a network node coupled to said network, wherein the active node includes:

A) resources to store data defining a policy rule for a device coupled to the network;
B) resources in the active node for producing a packet including a variable and a method in response to the data defining the policy rule; and
C) resources in the active node for sending a packet file containing one of the packet and a reference to the packet to the network node, wherein the network node includes resources to receive, decode, and execute the packet.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
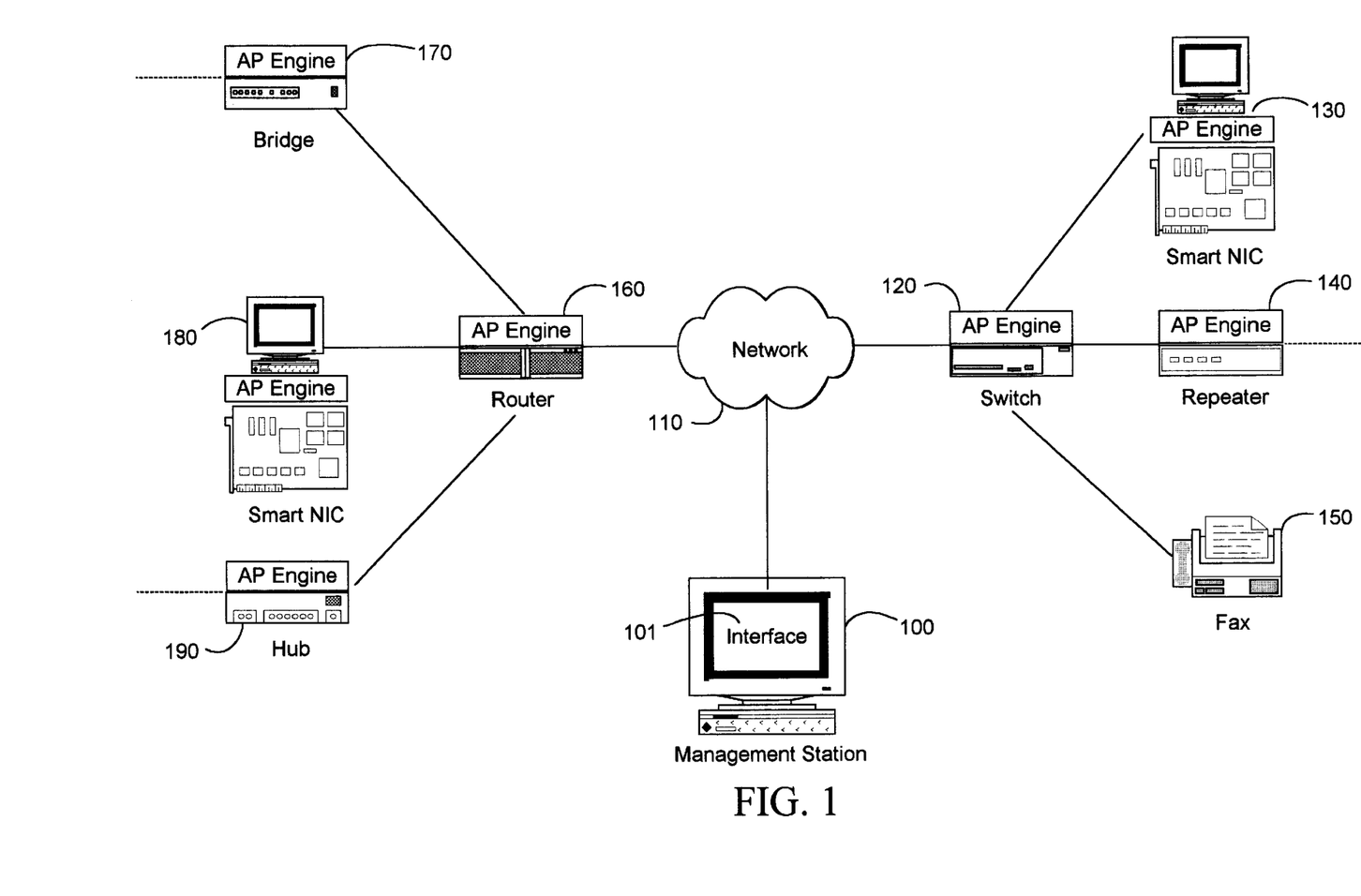
FIG. 1 is schematic diagram illustrating the interconnections of the management station, the network and the enforcement devices of the present invention.

FIG. 1 illustrates a schematic diagram of a general network and its connected network devices. The management station 100 comprising an interface 101 is connected to network 110. Network 110 can be a WAN, LAN, INTERNET, or similar type network wherein devices are inter-connected and control, i.e., policy, is desired. The intermediate network devices, such as switch 120, smart NIC, 130 and 180, repeater 140, router 160, bridge 170 and hub 190 are connected to network 110. Peripheral devices such as fax 150, include but are not limited to,printers-and modems are connected to any one of the intermediate devices. The intermediate network devices are coupled to an active packet (AP) execution engine, as depicted in FIG. 1, which provides resources for executing an active packet created by the management station 100 pursuant to the policy definition language (PDL) and transferred to a network intermediate or end device.

Figure 2:
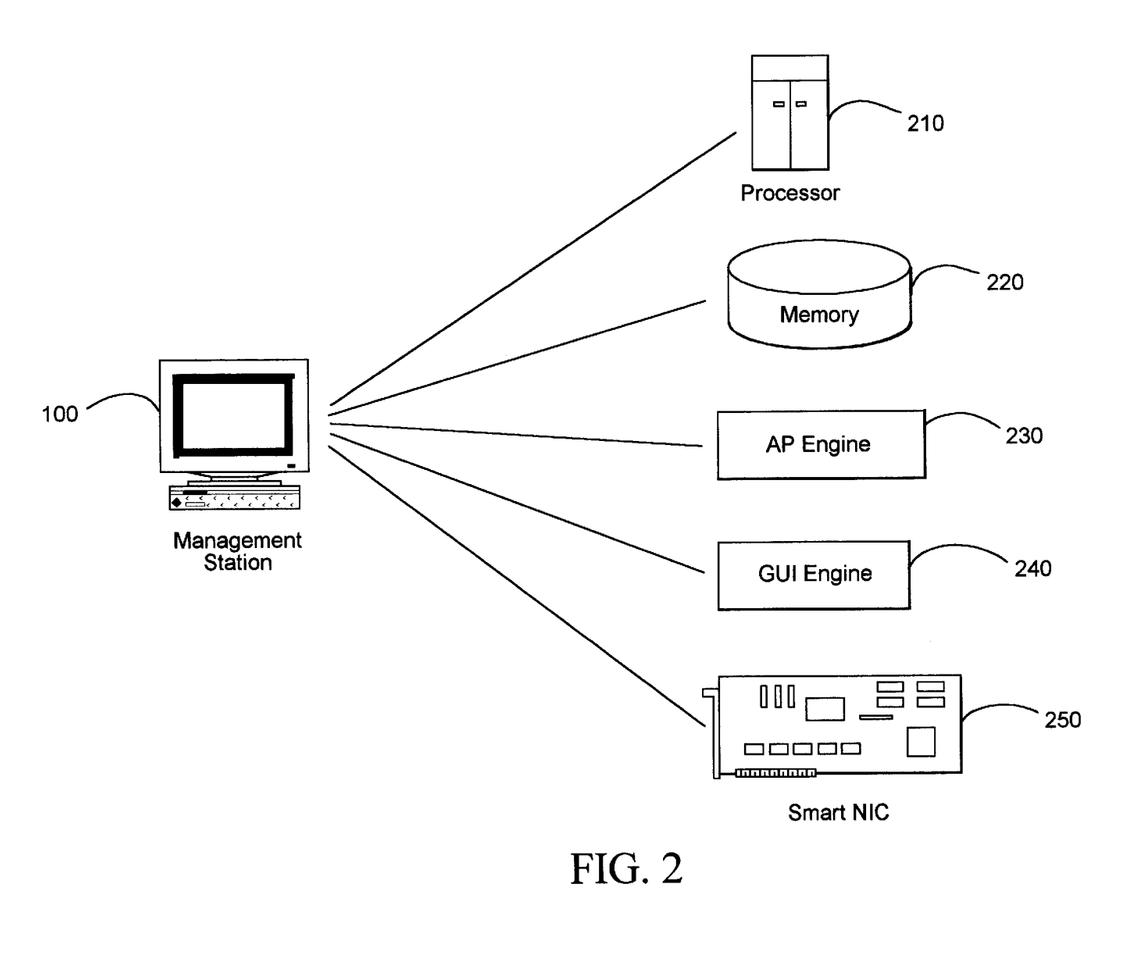
FIG. 2 depicts a general-purpose computer and its resources of the present invention.
Figure 3:
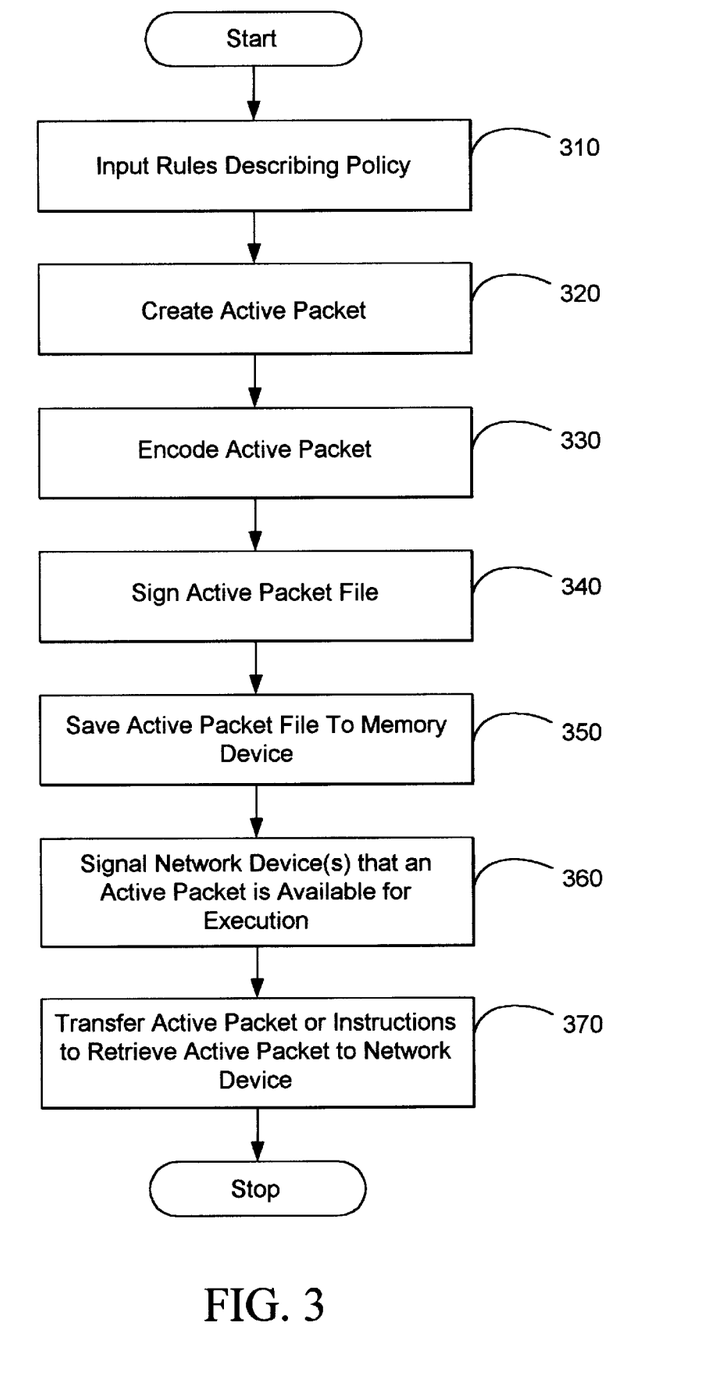
FIG. 3 is a flow diagram illustrating the process steps performed by the software product for creating and storing the objects of the present invention.

FIG. 2 illustrates the resources of management station 100 and FIG. 3 depicts a flow diagram of the process steps executed by the PDS software product utilized by the management station 100 of the present invention.

The system administrator inputs instructions representing policy through a interface 101, which includes but is not limited to a graphical user interface GUI, of management station 100. As shown in FIG. 2, the management station 100 comprises a general purpose computer operating pursuant to a first software product providing a user interface for inputting instructions representing system policy. The general-purpose computer includes, but is not limited to, an IBM, IBM-clone, UNIX workstation, Macintosh, Sun Microsystems, or similar computer capable of executing an policy definition system. The management station 100 operates pursuant to an operating system including, but not limited to, Windows or Windows NT, UNIX, OS/2, Mac OS 8.0 or similar operating system.

The management station 100 includes a processor 210, memory 220 running a general-purpose operating system, and an engine operating pursuant to PDS software 230 such as JAVA Virtual Machine operating pursuant to JAVA. The management station 100 further includes a graphical GUI engine 240 and a smart NIC 250 which provides access to the network 110. The system administrator proceeds to input the instructions representing policy in the form of rules. The rules can be generated at the time of the input and saved for future reference or they may have been previously generated to handle specific poliy situations and stored in the memory 220 or some other memory device connected to network 110 for later access. In one embodiment basic rules are predetermined and selected form a table and populated with at least one variable and a method using the GUI 240 and stored in memory 220.

For example, the system administrator may decide that the system traffic is very heavy on Mondays and Fridays causing system congestion, resulting in a degradation of system performance. The administrator can implement a policy whereby Internet access may be limited or totally eliminated during working hours on Mondays and Fridays. The policy will be created and dispatched to the appropriate network devices to effectuate this policy. In FIG. 1 this may be the smart NIC/AP engine combination 130, Router/AP engine combination 160, or Switch/AP engine combination 120 working alone or in combination to effectuate the policy for disabling Internet access on the dates and times in question. The reader should; note that from this point on in the disclosure that a reference to switch 120, smart NIC 130, repeater 140, router 160, bridge 170, and hub 190, of FIG. 1, also includes the AP engine that the aforementioned devices are in communication with.

The rules contain a variety of information necessary to effectuate the current policy or policies dictated by the system administrator. For instance, the rules may contain information which includes, but is not limited to, network and transport layer source addresses, network and transport layer destination addresses, protocol(s), time of action, conditionals, e.g. if time of day is between 8:00 a.m. and 5:00 p.m. disable Internet access, and other variables related to the execution of the policy by the network devices.

Figure 5:
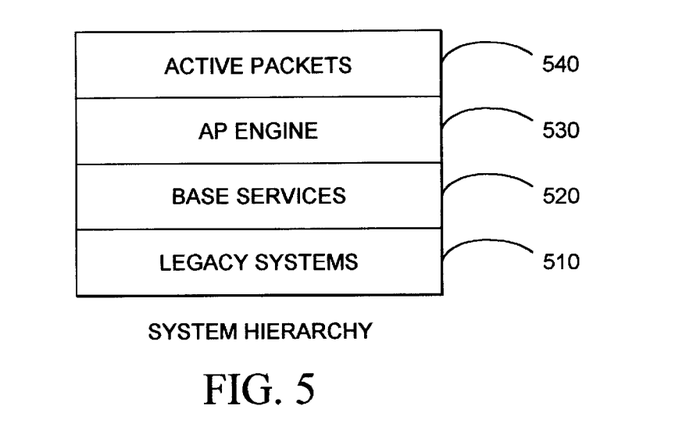
FIG. 5 illustrates a hierarchy of systems executing multiple software products of the, present invention.

The process steps, performed by the software product running on management station 100, for the transformation of the rules to active packets will be described with reference to the flow diagram of FIG. 3 and process steps 310 through 380 illustrated therein. The AP engines depicted in FIG. 1 are devices capable of executing active packets, operating independently of the legacy systems supporting the network devices, and are configured as shown in FIG. 5. A discussion of the AP engine and its interrelationship with the base operating system will now ensue before continuing with the detailed description of the present invention.

In FIG. 5 the legacy systems 510 perform base services 520, which include, but are not limited to, recognizing input from the keyboard, sending output to the display screen, keeping track of files and directories on the memory devices, and controlling peripheral devices. The legacy systems can also perform policy enforcement, but require the system to be rebooted to purge the system of any currently executing policy. The AP engine is a self-contained operating environment that behaves as if it is a separate computer, i.e., similar in many respects to a virtual machine (VM). An example of a special type of AP engine is the JAVA Virtual Machine (JVM), which executes active packets. Since JAVA is an object-oriented language, the active packets executed by the JVM are JAVA objects. JAVA objects and JAVA applets are executed by the JVM on a level above the host operating system, i.e., legacy system.

The AP engine design has two main advantages: 1) System independence, wherein application, i.e., active packet, will run the same regardless of the hardware and software underlying the system, hence, an active packet formatted to execute on the AP engine can also be executable by a VM or a JVM; and 2) Security, since the AP engine has limited or no contact with the operating system, there is little possibility of an active packet damaging files or applications running on the legacy systems 510; this approach allows for the dynamic transfer and execution of active packets, i.e., objects or codes, without having to reboot the AP engine or legacy system, thereby interrupting the base services 520 being provided by the legacy systems 510.

As shown in FIG. 1 and the flow diagram of FIG. 3, the rules are inputted into management station 100 pursuant to step 310. After entering the rules, the rules are transformed into objects at step 320, each object having a format. The format comprises a data structure established according to and AP executable representation particular to the network device that will enforce the policy. Objects are higher level representations of the policy to be enforced by the enforcement devices 120, 130, 140, 160, 170, or 190 distributed throughout the network. In a preferred embodiment the created objects are active objects.

The rules are then transformed into objects by instantiation of classes in the management station 100 pursuant to the step 320. At step 330 the object is encoded. In a preferred embodiment the encoding is encapsulation. Encapsulation is a process whereby the objects representing one or more rules representing a policy is encoded making the object transportable. The encoding process removes the environment specific parameters from the object, thereby making it mobile. In a most preferred embodiment, the JAVA method of serializing the object is the encoding method employed. Programming languages which support the creation of objects, include, but are not limited to, JAVA, C++, CAML, Python, and Smalltalk.

At step 340 the software optionally signs the object file. The purpose of the signature is to provide the enforcement devices with information to allocate rights and privileges to the objects contained within the object file when the object or objects are executed on the enforcement device, i.e., one of the network devices 120, 130, 140, 160, 170, or 190 of FIG. 1 In preferred embodiment the signature comprises a digital signatures.

Figure 4:
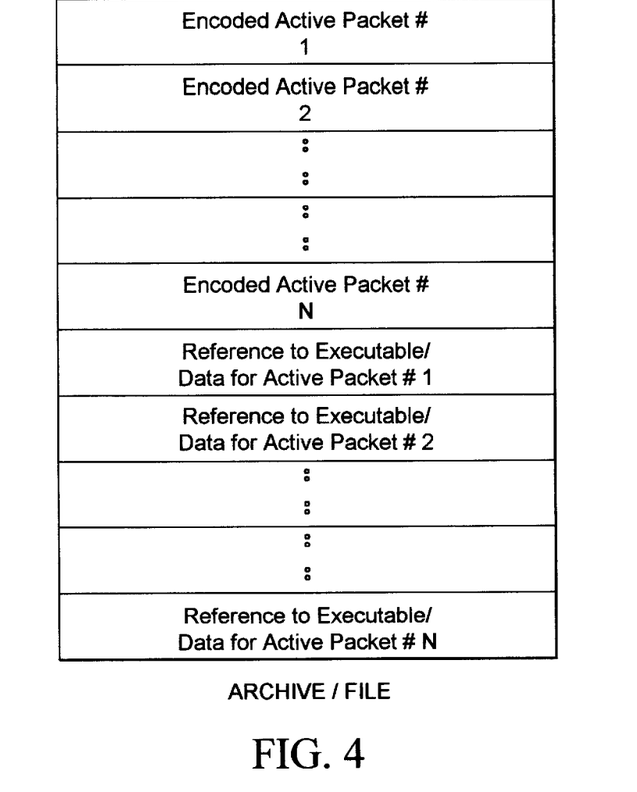
FIG. 4 illustrates a stored file of objects and their references to the methods and data necessary to execute the object of the present invention.

At step 350 the software stores the file on a memory device containing the objects along with their references to variables and methods necessary to execute the objects. A typical object file is depicted in FIG. 4, wherein the encoded object and references to the encoded object are stored to a file or archived. The object file and its variables and any required methods for execution can be stored on a common memory device or on a directory server or distributed database. The object file and its variables can also be stored on management station 100, the network 110, or one of the policy enforcement devices as long references are provided so that the policy enforcement devices can access the appropriate memory device address to retrieve the necessary data for execution.

At step 360, the management station 100 signals the policy enforcement device that new policy, in the form of an object file, is available. Management station 100 either forwards the object file containing the required variables and methods or references to the variables and methods to execute the object and enforce the policy to the network 110 or to some other memory device, i.e. directory server, distributed database, etc., pursuant to step 370. It should be noted that since the network 110 generally operates on several levels each requiring different protocols that the variables and methods must be formatted, with the appropriate data structures and protocol, at management station 100 by the PDS software. The formatting is necessary to accommodate the myriad parameters necessary for a successful transmission and execution of the object and hence the enforcement of the specific portion of the policy assigned to that network device.

The technique of using objects to represent and enforce policy permits the dynamic modification of policy without having to reboot the enforcement device to purge it of a previous policy. Multiple policy rules are capable of being supported concurrently on each network device equipped with an AP engine. In the event that inconsistent policy rules are scheduled to be executed on the same enforcement device, several alternatives are available. A first or last in time approach can be taken wherein either the first policy rule or last policy rule provided to the enforcement device will take priority.

If the first in time approach is taken, the object representing the new policy rule may be loaded into memory, but the system resources will not be allocated to it until the first process is concluded. In the latter approach the first process may be terminated and its variables and states along with the attendant resources allocated to its execution are returned to their initial states before the execution of the new policy rule. Other approaches, as determined by the system administrator, can be implemented to overcome conflicts between objects and will be apparent to persons of ordinary skill in the art, and therefore will not be discussed at this time.

An example of the above process will now be given. The system administrator at management station 100 inputs a rule to discontinue traffic between hub 190 and the users attached to that node. The rule in question is selected from a table accessed by a GUI 101 being executed on management station 100. The rule is then converted into an object, encoded with the proper format, i.e., data structures and protocol for the network device or devices that it is intended to be executed on, then saved into an object file, which is digitally signed. The object file along with any implementing code or data is sent to the network 110 to be stored. In this example the object file and its attendant code, here code refers to the methods and data necessary to execute the object in the file, will most likely be sent to hub 190, or router 160, or stored at the management station 100 in the memory 220. It should be noted that storing the object at management station 100 is not the preferred storage location.

This is because if management station 100 is busy because of system congestion or loses its connection to the network 110 then the code and/or object necessary to effectuate the policy by the network devices 160 or 190 will not be accessible.

Either hub 190 or router 160 can enforce the policy established by the system administrator. Router 160 could perform a primary or secondary function or it could complement hub 190 by enforcing a portion of the policy. Conversely, the object could be designated as private code signed such that only hub 190 or router 160 is permitted to access and execute the object file. The network devices have resources, i.e., logic, to receive and read the object provided by management station 100 thereby determining access and execution rights and privileges. The following discussion will be premised on hub 190 being the only network device involved in this particular policy enforcement.

Figure 6:
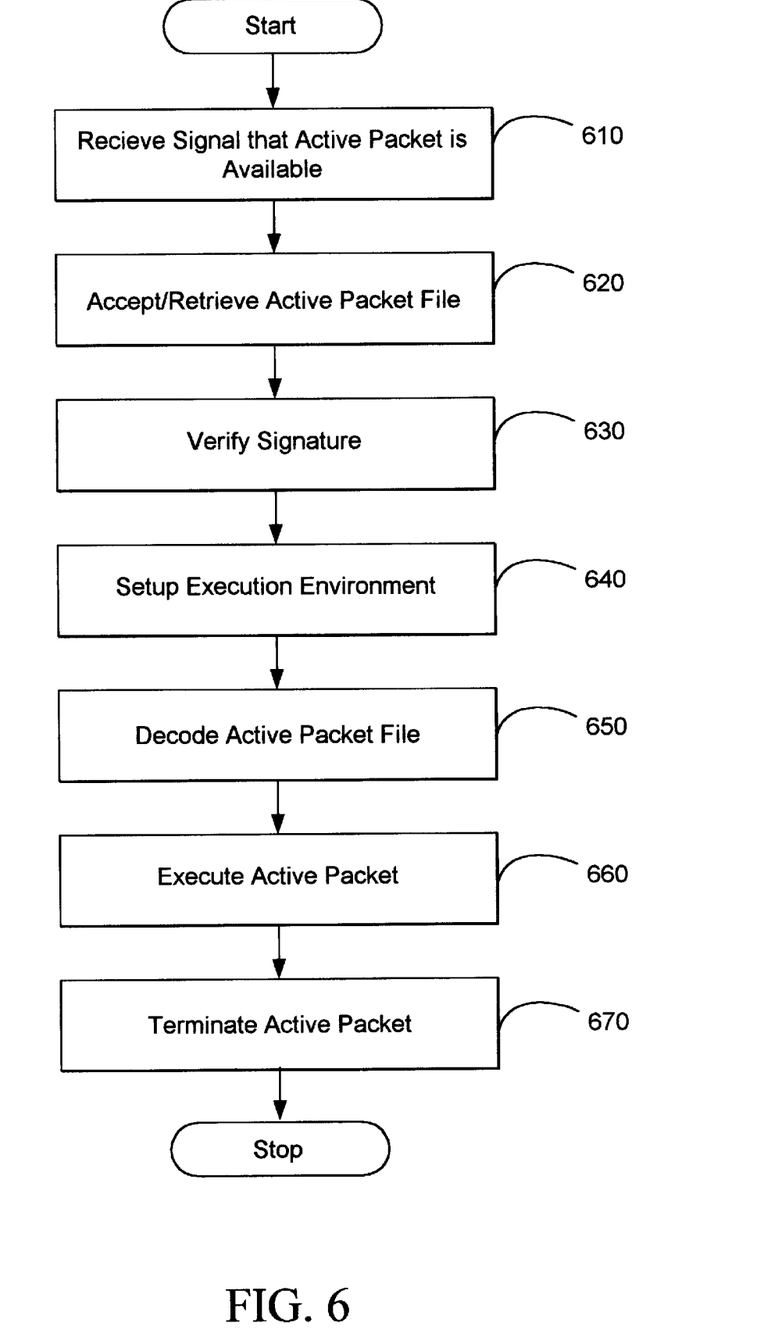
FIG. 6 is a flow diagram illustrating the process steps of the software product for deserializing and executing objects of the present invention.

FIG. 6 depicts a flow diagram of the process steps performed and an execution environment set up by the software running on the AP engine at hub 190. At step 610, the engine is signaled that a new object or objects are ready for its use and execution. Pursuant to step 620 hub 190 accepts the object file or instruction to retrieve the object file and any code necessary to execute the object in the file. The object file signature is optionally verified, pursuant to step 630, and an execution environment 640 is established to execute the object.

The establishment of the execution environment step 640 is to provide base services to the object for its use in its execution. This will include, but is not limited to, setting ad clearing filters, setting and clearing timers, reading and writing states within the network device related to congestion, priority-based forwarding, and similar operations. The AP engine is capable of executing multiple objects concurrently on hub 190. Pursuant to step 650 hub 190 will then decode the object, i.e., examine the data within the object which specifies the variables and methods required for that object, and access its memory for the variables and methods necessary to execute the object. If the variables and methods required by the object are not available in its memory, it will then retrieve and extract the variables and methods from the appropriate memory device, i.e., directory server or distributed database, using the references provided within the object by management station 100. A previously noted, the object may be designated as a private code and only accessed and executed by a particular network device.

After having retrieved the necessary methods and data to execute the object the object will be executed pursuant to step 660. In a preferred embodiment the decoding process is a method of unwrapping the encapsulated object. In a most preferred embodiment the decoding process is the JAVA method of de-serializing the object. The thread of execution associated with each object will then be executed invoking the method that the object implements, thereby providing hub 190 with the resources and functionality necessary to enforce the policy and block all traffic beyond its node.

The policy represented by the object at hub 190 may be of a limited duration or perpetual until either it is replaced or canceled by a subsequent object. Since the objects are capable of executing dynamically, without the need to power down the network device as in the conventional case, the implementation and modification of an object can be performed without regard to the functioning of the legacy system 510.

In general a currently running object that is scheduled to be terminated by a subsequent object will not terminate until the subsequent object is executed by its thread of execution. When a thread completes execution, the environment reclaims any resources it has allocated to it (in some systems this may be automatic, for example by system-wide garbage collection), and then determines what to do with the implementing code. It may decide to retain it in its code, file library, or it may discard it.

If the network administrator wishes to stop the execution of the thread associated with an object, he uses the management station 100 to signal the network device to terminate the object's thread. Reasons for such termination include, but are not limited to, the network policy has changed or the administrator wishes to correct a mistake made in a previous policy specification. The enforcement device can also terminate the execution of an object's thread. This may be necessary, but is not limited to, an over consumption of resources, or when the signer of the object is no longer trusted to execute code on the device, or the period over which the policy was being enforced has expired, or the triggering condition no longer exists on the system.

In an embodiment of the present invention the object is executed on a JAVA Virtual Machine (JVM) or similar device capable of running a mobile language such as, but not limited to, CAML, JAVA, Python, Smalltalk.

In an alternative embodiment, active networking can be performed using a script programming language (SPL) such as, but not limited to, Practical Extraction and Report Language (PERL), Tool Command Language (TCL), or shell type programming language.

The above-described embodiments of the present invention can be employed in any type of system wherein an AP engine, VM, or similar device has been established with the device and provides resources to enforce policy at the network device using the above-described active networking principles. Active networking includes, but is not limited to, sending active packets, i.e., objects or code, to a network device or a network intermediate device by the network management station in order to tailor network device behavior according to some system administration objective. Active networking also permits applications to send active packets to network devices, which lie between them and the destination of their traffic.

As demonstrated, active nodes can provide a larger variety of functionality with the same amount of dynamic memory wherein a passive network device must contain all of the code implementing its full feature set. Once a passive device is deployed, its feature set may only be modified by loading a new version of the software. Conversely, an active node need only have the code resident that is necessary to support the features currently in use and is capable of dynamic change without rebooting the device.

In addition to the active packet services described above, the AP engine provides the following general services. It provides a multiplexing substrate for executing threads. This allows the code from multiple active objects to execute concurrently without adversely affecting the executions associated with other active objects. It provides a security subsystem for controlling access to active node resources. These resources may be native to the node such as clocks, buffer memory, or network interfaces or they may be logical resources created by shared libraries or representing exported entry points of executing active code.

An active node is a device operating pursuant to a general-purpose operating system, such as one of the varieties of UNIX or it may be operating pursuant to an existing networking device, which generally uses a proprietary or commercially supported real-time operating system (RTOS). The term software-based active node is used to describe the former and the term hybrid active node to describe the latter. In both cases only a part of, the device is dedicated to active networking.

Traditionally, network devices do not support the notion of multi-user computations, even if they are based on multiprogramming operating systems, such as UNIX. While there may be administrative access control, which assigns different privileges to different users generally these do not translate into processes running in separate address spaces. Rather, the privileges are normally assigned to the terminal connection or console port, which the administrator uses.

Active networking introduces new requirements that lead to more sophisticated access control mechanisms. For example, active code in execution may wish to communicate with other executing active code. The two threads may represent computations carried out on behalf of two different principals. This active networking provides for more dynamic system administration and enforcement, heretofore not provided nor contemplated by conventional means.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the following claims and their equivalents define the scope of the invention.

What is claimed is:

1. A process for dynamic policy management in a network comprising the steps of:
   defining, in a management node, a policy rule for allocation of resources of a device in the network, the device having a behavior, and utilizing said resources according to the behavior;
   incorporating information in a packet, the information comprising 1) data, and 2) either code a reference to code or both;
   transmitting the packet through the network to the device on the network, the code in the packet being executed in the particular device either:
   a) unconditionally in response to being received at the device; or
   b) conditionally, in response to a process in the device that responds to the data in the packet; the code being executable by the device to detect events and to modify the behavior so that the allocation of resources of the device changes in response to said events according to the defined policy rule.

2. The process of claim 1, wherein said events comprise time of day.

3. The process of claim 1, wherein said events comprise volume of traffic at the particular device.

4. The process of claim 1, wherein said events comprise traffic patterns at the particular device.

5. The process of claim 1, wherein said behavior comprises layer 3 packet routing.

6. The process of claim 1, wherein said behavior comprises layer 2 packet switching.

7. The process of claim 1, wherein said behavior comprises transmitting and receiving packets at layer 2.

* * * * *